United States Patent
Cox et al.

(10) Patent No.: US 11,569,706 B2
(45) Date of Patent: Jan. 31, 2023

(54) ELECTRIC MACHINE

(71) Applicant: AUDI AG, Ingolstadt (DE)

(72) Inventors: Jason Cox, Ingolstadt (DE); Zsolt Bárány, Györ (HU)

(73) Assignee: Audi AG, Ingolstadt (DE)

( * ) Notice: Subject to any disclaimer, the term of this patent is extended or adjusted under 35 U.S.C. 154(b) by 256 days.

(21) Appl. No.: 16/950,672

(22) Filed: Nov. 17, 2020

(65) Prior Publication Data

US 2021/0152046 A1   May 20, 2021

(30) Foreign Application Priority Data

Nov. 18, 2019   (DE) .......................... 102019131082.2

(51) Int. Cl.
| | |
|---|---|
| *H02K 5/18* | (2006.01) |
| *H02K 5/20* | (2006.01) |
| *H02K 9/06* | (2006.01) |
| *H02K 7/00* | (2006.01) |
| *B60K 1/00* | (2006.01) |

(52) U.S. Cl.
CPC ................. *H02K 5/18* (2013.01); *B60K 1/00* (2013.01); *H02K 5/20* (2013.01); *H02K 7/006* (2013.01); *H02K 9/06* (2013.01)

(58) Field of Classification Search
CPC .............. H02K 5/18; H02K 9/06; H02K 7/006
USPC .......................................... 310/52, 54, 58, 62
See application file for complete search history.

(56) References Cited

U.S. PATENT DOCUMENTS

| | | | |
|---|---|---|---|
| 2013/0076169 A1* | 3/2013 | Pal | H02K 9/19 310/59 |
| 2019/0199170 A1* | 6/2019 | Cox | B60K 1/00 |

FOREIGN PATENT DOCUMENTS

| | | |
|---|---|---|
| DE | 10 2010 001 705 A1 | 8/2011 |
| DE | 10 2015 000 536 A1 | 7/2016 |
| DE | 10 2016 222 850 A1 | 5/2018 |
| DE | 10 2017 211 346 A1 | 1/2019 |
| EP | 2 641 318 B1 | 10/2016 |
| EP | 1 931 017 B1 | 11/2016 |
| GB | 2401730 A * | 11/2004 ............. H02K 7/102 |

* cited by examiner

*Primary Examiner* — Jose A Gonzalez Quinones
(74) *Attorney, Agent, or Firm* — Seed Intellectual Property Law Group LLP

(57) ABSTRACT

An electric machine comprising at least one housing in which a rotor having coolant guide vanes provided at an end face is accommodated, and an annular cooling fin structure through which coolant conveyed by the coolant guide vanes is passed and having cooling fins which are axially covered by an annular cover section in such a way that there is an inlet area for the coolant supplied by the coolant guide vanes and an outlet area, wherein the cooling fin structure is formed on a side of an axial end wall of the housing facing the interior of the housing, on which an annular disk-shaped cover forming the cover section is attached.

15 Claims, 8 Drawing Sheets

ELECTRIC MACHINE

BACKGROUND

Technical Field

Embodiments of the invention relate to an electric machine comprising at least one housing in which a rotor having coolant guide vanes provided at an end face is accommodated, and an annular cooling fin structure through which coolant conveyed by the coolant guide vanes is passed and having cooling fins which are axially covered by an annular cover section in such a way that there is an inlet area for the coolant supplied by the coolant guide vanes and an outlet area.

Description of the Related Art

Powerful electric machines require cooling in order to be able to dissipate the heat generated during operation. For this purpose it is known to arrange a separate cooling ring on the housing in which the stator and the rotor are accommodated, in the area of a housing bottom which is provided with a correspondingly large outer groove, which cooling ring is used to cool a coolant circulating inside the housing such as, for example, air, another electrically insulating gas or an electrically insulating liquid. This coolant is specifically conveyed to the cooling ring or sucked in via coolant guide vanes provided on the rotor side, which cooling ring has a cooling fin structure that is stationary after the cooling ring is firmly installed in the housing. The supplied coolant is guided along the cooling fins of the cooling ring, where it is cooled. For this purpose, the cooling ring itself is integrated into a coolant circuit; a coolant such as cooling water is supplied to it from outside, so that the cooling ring and thus also the cooling fins are actively cooled. A heat transfer takes place at the cooling fins from the above-mentioned housing-side coolant to the cooling fins; the heat is dissipated via the coolant circulating through the cooling ring. An electric machine designed in this way is known, for example, from DE 10 2015 000 536 A1.

In order to achieve a directed flow of the housing-side coolant through the cooling fin structure, an annular cover section is provided on the cooling ring itself in known electric machines, which locally covers the axially projecting, usually radially extending cooling fins, which are formed on the ring side facing the housing, so that there are two defined areas. On the one hand, an inlet area in which the cooling fin structure is open axially or radially. The housing-side coolant is supplied to the cooling fin structure via the coolant guide vanes via this open inlet area. On the other hand, an axially or radially open outlet area is also defined via the cover section, from which the coolant leaving the cooling fin structure flows out and flows back into the housing. Usually, the inlet area is radially outside and the outlet area is inside, depending on the direction of flow, the arrangement can also be the other way around. Such a cooling fin structure is shown, for example, in the electric machine described in DE 10 2017 211 346 A1.

In order to be able to manufacture such a cooling ring comprising on the one hand the central ring body with the corresponding flow structure, which enables the externally supplied coolant to flow through the cooling ring, and comprising the cooling fin structure and the annular cover section formed integrally thereon, the cooling ring must be produced as a sand cast component, i.e., using a sand casting or sand molding process, in a costly manufacture. A lost mold is used here, i.e., a mold that is destroyed after being used once to demold the cooling ring. However, this production method is very expensive, resulting from the complexity of the cooling ring structure.

In order to achieve an improvement here, the electric machine known from DE 10 2017 211 346 A1 provides that only the cooling fins are formed on the cooling ring, while the annular cover section is formed on the housing. The cooling ring therefore only has the cooling fin structure, i.e., the corresponding, annular cooling fin arrangement with the radially running cooling fins, but not the annular cover section, which is part of the housing, which is usually manufactured as a die-cast component anyway, where it is integrated on the housing bottom. This is possible because, in the assembly position, the cooling fins of the cooling ring run directly adjacent to the housing or to the housing bottom and thus adjacent to the cover section formed there, and are therefore covered by it, resulting in the corresponding guiding structure for the housing-side coolant, despite the displacement of the cover section. Although this already achieves a significant improvement, in particular with regard to the manufacture of the relevant components, there is nevertheless a desire to further improve such an electric machine.

BRIEF SUMMARY

Thus, embodiments of the invention are based on the problem of specifying an electric machine with simple design.

To solve this problem, it is provided in an electrical machine of the type mentioned that the cooling fin structure is formed on a side of an axial end wall of the housing facing the housing interior, to which end wall an annular disk-shaped cover forming the cover section is attached.

In the electric machine, the cooling fin structure itself is an integral part of the housing of the machine. It is formed on an axial end wall of the housing, the cooling fins extending towards the interior of the housing. In order to form the inlet and outlet area, a simple annular disk-shaped cover is placed on this integral cooling fin structure and attached on the housing side, which locally covers the cooling fin structure so that the corresponding inlet and outlet area is formed in the areas adjacent to the cover, via which the coolant conveyed by the coolant guide vanes can enter and exit the cooling fin structure.

The electric machine is characterized by extreme simplicity with regard to the implementation of the coolant structure. The production of a separate cooling ring, which is to be attached on the housing side, may no longer be necessary after the cooling fin structure as such is integrated on the housing side. The cooling fin structure can also easily be produced on the housing using the die-casting process, since the cooling fin structure is open to the interior of the housing, which means that nothing changes in the production process for the housing as a die-cast component. Only a corresponding annular disk-shaped cover needs to be produced as a separate component, which is easily possible in the form of a corresponding metal component, possibly also a cast component. In addition, the electric machine is also very compact due to the end wall-side integration of the cooling fin structure and the very thin cover that is merely placed on it.

The cover itself may be bolted to the front wall, which makes it very easy to fix it on the housing side. For this purpose, appropriate bores may be provided on the cover and the end wall, through which screws engage, which are each supported on the cover with their screw head and which are bolted to the end wall by way of a nut. Alternatively, the arrangement of the connecting means can also be reversed.

As described, the cover serves to define the cooling channel structure with the essentially radially extending cooling channels in connection with the cooling fins. So that, on the one hand, a simple introduction of the coolant into the cooling channel structure and, at the same time, a simple exit is possible, the cover may cover the fin structure over at least one third to a maximum of two thirds of the radially seen fin length. This ensures that the cooling fin structure or the channel structure, viewed axially, is open at the inlet and the outlet so that the axially supplied coolant can enter without any problems and is also guided over a sufficient channel length in the channels until it exits and, in particular, flows axially away from it.

The cooling fins themselves may run radially, resulting in radially extending cooling channels.

Although an electrical machine can be designed as a "single machine," with only one housing, one stator, one rotor and a corresponding cooling device, it is equally conceivable, for example, for the integration of such an electrical machine as a drive in a motor vehicle rear axle to design the machine as a "dual machine," which means that in this case, two housings which are arranged like mirror-images are provided, in each of which a rotor, a fin structure and a cover are provided, wherein between the two housings a common distribution device for distributing coolant serving to cool the rotors and the end wall at least in the area of the fin structures is provided. In this electric machine, with the exception of the one common coolant distribution device, all other components are provided twice, but in a mirror-image arrangement. Thus, two mirror-image housings are provided, each of which has a fin structure integrated in the end wall and each of which has a cover, and of course a rotor and a stator each and the other components required for machine operation. The housings may be configured identically, but arranged like mirror images. This is easily possible as the corresponding connection interfaces on the housings can be configured and positioned in such a way that they can interact or be connected to one another with a corresponding mirror-image arrangement in which the two end walls are arranged adjacent to one another. A common distribution device is provided between the two housings, that is to say between the end walls, which makes it possible to receive the coolant supplied from outside, to distribute it to the two housings, and also to discharge it. The coolant itself is primarily used for rotor cooling, that is to say, it is supplied to the two rotors via the distribution device in a manner to be described in more detail below in order to cool them, and coming from the rotors it is received again and directed to the housing outlet. The configuration of this distribution device is such that the two end walls can also be cooled at least in sections at the same time, so that cooling also takes place in the area of the fin structure, which in turn can be used to cool the coolant circulating inside the housing.

The distribution device may be characterized by two distribution elements, between which a sealing element is arranged, and which delimit an inlet channel and an outlet channel for the coolant. These two distribution elements, which can be designed, for example, ring-shaped and approximately disk-shaped, accommodate a corresponding sealing element between them and have corresponding semi-geometries which, sealed by the sealing means, interact and define the corresponding inlet channel, via which the coolant is supplied to the distribution device and distributed from there, and the outlet channel via which the coolant recirculated from the rotors is taken up again and led to the outlet. The distribution elements are designed to be relatively narrow, i.e., viewed axially, have only a small thickness, so that the entire distribution device is rather small when viewed axially and consequently can easily be integrated into a narrow installation space, which leads to further compaction of the electric machine, since the housings can be designed with regard to the arrangement of the end wall having the cooling fin structure so that the end wall can be arranged as close as possible to the respective housing end.

The inlet and outlet channels may run radially and are offset from one another by 180°. This makes it possible to supply the coolant to one side of the distribution device and to discharge it on the opposite side of the distribution device.

As described, it is also possible via the distribution device to cool the respective end wall at least in sections using the coolant, i.e., to direct the coolant flow within the area between the end walls in such a way that the coolant flows along at least a section of the end walls. In order to achieve this in a simple manner, the outlet channel may open into two ring channels, each ring channel being formed between the respective end wall and the adjacent distribution element and opening into a housing-side outlet. Accordingly, the two distribution elements together with the respectively adjacent end wall delimit an annular space which runs as close as possible or as far as possible overlapping to the annular cooling fin structure formed on the opposite end wall side. After it has been recirculated from the two rotors, the coolant is directed into this annular space via the distribution element-side outlet channel, where it is distributed or along which ring channels it flows, thereby cooling the end wall. It flows from the ring channels into a corresponding housing-side outlet from where it is then discharged. The two housing-side outlets may be as closely adjacent as possible on the same side of the housing. The transition from the outlet channel to the ring channel is as diametrically opposite as possible, for example within a segment of a circle of 120-180°, so that the coolant entering the respective ring channel flows into the ring channel on both sides and reaches the outlets offset in the circumferential direction. The arrangement may be such that the coolant supplied from both ring channels is distributed jointly to both outlets. This consequently makes it possible to cool the end wall via a relatively large annulus segment, which is larger, the closer the two housing-side outlets are positioned, viewed in the circumferential direction.

In principle, it would also be conceivable for each ring channel to open into only one outlet. In order to then guide the coolant as far as possible along the side wall, i.e. to make the ring channel as long as possible, the respective outlet would in this case be arranged as close as possible, viewed in the circumferential direction, to the transition from the distribution device-side outlet channel to the ring channel. In this case, if this transition is appropriately designed, the coolant can flow through the ring channel only in one direction, which ring channel then describes, for example, a segment of a circle of 300° or more, a maximum of 360°, while in the above-mentioned alternative, in which the two outlets are on quasi opposite sides of the housing, although the ring channel also describes a segment of a circle of, for example, 300° to a maximum of 360°, but the coolant flowing or distributing on both sides into the ring channel from the outlet channel only circulates quasi half the way in the respective branch.

In order to connect the outlet channel to the two ring channels, each distribution element may be provided with an outlet opening, the two outlet openings being axially opposite one another and the outlet channel being connected to one ring channel in each case. This ensures that the coolant is introduced or branched into both ring channels quasi at the same point.

So that the coolant can be supplied from the two ring channels to the respective or both outlets, it is provided that each distribution element may have an opening, which are arranged adjacent to one another in the circumferential direction and via which one ring channel is connected with a housing-side outlet. Here, too, a corresponding distribution element-side opening is provided in a simple manner to connect the corresponding sections, through which the coolant can pass. If the distribution device-side inlet and outlet are formed quasi in a radial extension of one another, then the two above-mentioned openings are arranged adjacent to the inlet channel. In the case of a different orientation of the inlet and outlet channels to one another, it would basically also be conceivable for the two openings to be arranged closely adjacent to one another as viewed in the circumferential direction and to overlap one another, so that in principle there is also the possibility of transferring the coolant quasi from both ring channels via the openings to a common housing-side outlet.

As described, the coolant supplied from outside to the inlet channel, which coolant is first introduced into the housing via a corresponding inlet connection, is then supplied to the distribution device. In order to make this possible, an inlet opening may be provided on each distribution element, both of which open into the common inlet channel. This makes it possible to supply the coolant supplied to a housing via the distribution element assigned to this housing or its inlet opening and bring it into the common inlet channel, while the coolant supplied via the other housing is supplied to the common inlet channel via its assigned distribution element or its separate inlet opening. Alternatively, it is also conceivable that the or both distribution element(s) delimit a common inlet opening which opens into the common inlet channel. Here, the two coolant flows from the two housings flow together in the area of the common inlet opening and are supplied to the inlet channel as a common coolant flow. The formation of such a common inlet opening is easily possible since the distribution device consists of the two distribution element halves, so that there, in turn, as with the inlet and outlet channels, corresponding semi-geometries can be provided that delimit or define the common inlet opening.

As described, the coolant is supplied to the hollow rotor from or via the distribution device. From the hollow rotor, the coolant then flows back to the distribution device to be distributed around there. To ensure that the coolant cools the rotor over the greatest possible axial length, a tube extending into a hollow rotor arm may be connected to each distribution element, each distribution element having an outlet opening through which the inlet channel is connected to both tubes, and that each distribution element has an inlet opening through which the coolant flowing back from the rotor arm flows into the outlet channel. The coolant consequently flows from the inlet channel via the outlet opening into the respective tube, which extends as far as possible into the hollow rotor arm, such as over half its length, or up to two thirds of its length or more. The coolant is introduced into the respective rotor arm via this tube, which can also be referred to as a lance. It flows out at the end of the tube, the end of the tube being as close as possible to the respective rotor-arm end, as described. From there, the coolant has to flow back again in order to get back into the distribution device via the respective distribution element-side inlet opening and from there to be distributed further via the outlet channel to the respective ring channel. During this return flow path, the coolant absorbs the rotor-side waste heat and thus cools the rotor.

As the two housings may be designed identically, the two distribution elements may also be designed identically, but are arranged as mirror images. This means that the same components are used here as well, so only one type of distribution element needs to be produced which is designed in such a way that when both distribution elements are arranged in mirror image to one another, the corresponding channel geometries, etc., are formed, as well as corresponding connection points, via which the two distribution elements are connected to one another by suitable screw connections, then face one another in exactly the correct position. This means that ultimately the "dual machine" can be built with one housing type and one distribution element type, both in terms of the housing and the distribution device. As the housing may be designed as an aluminum die-cast component, and just as the respective covers can be designed as aluminum die-cast components, each distribution element may also be designed as an aluminum die-cast component. This is easily possible as the two distribution elements are of a simple geometric shape and are ring-shaped or approximately disk-shaped, with the corresponding semi-geometries of the two distribution elements complementing each other, as described, to form the corresponding inlet and outlet channels. This means that no cavities need to be formed on the respective distribution element, which enables a corresponding production as a die-cast component.

In addition to the electric machine itself, embodiments of the invention also relate to a motor vehicle, comprising at least one electric machine of the type described above.

The electric machine may be part of a rear axle of the motor vehicle, wherein each side of the axle can either be assigned a separate electrical machine, i.e., two "single machines" are provided, or wherein the rear axle has a common electric machine, thus has a "dual machine" by way of which both sides of the axle are operated.

Regardless of the specific configuration of the electric machine, each housing is provided with a corresponding gear to which the rotor or its drive socket is coupled.

BRIEF DESCRIPTION OF THE SEVERAL
VIEWS OF THE DRAWINGS

Further advantages and details emerge from the exemplary embodiments described below and on the basis of the drawings.

DETAILED DESCRIPTION

Figure 1:
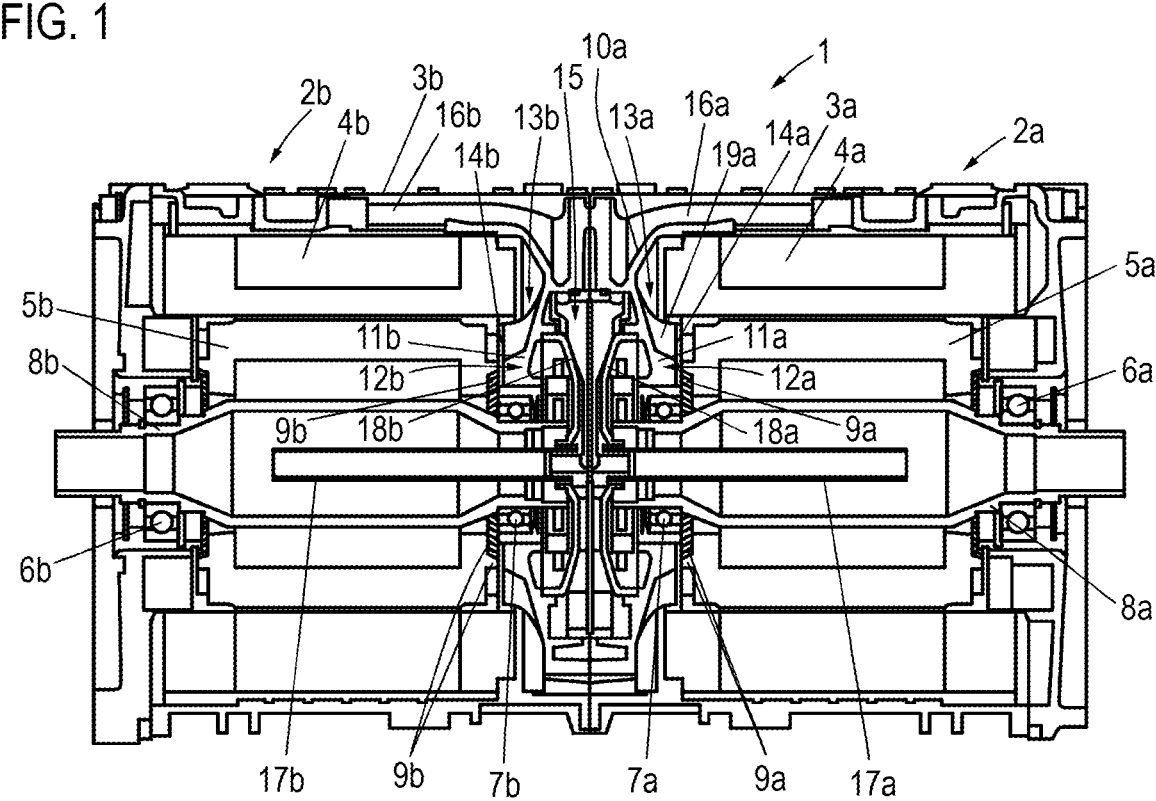
FIG. 1 shows a schematic diagram, in section, of an electric machine according to an embodiment of the invention.

FIG. 1 shows a schematic diagram of an electric machine 1 according to an embodiment of the invention, which is designed here as a dual machine and has a first partial machine 2a and a second partial machine 2b. Both partial machines 2a, 2b are designed identically in this respect. They each comprise a housing 3a, 3b, which are each made of die-cast aluminum and are designed identically, but are arranged in mirror image to one another. A stator 4a, 4b and a rotor 5a, 5b are arranged in each housing, the stator 4a, 4b being fixed in position, while the rotor 5a, 5b—via roller bearings 6a, 7a or 6b, 7b—is rotatably mounted via a rotor arm 8a, 8b provided on the rotor side.

Each rotor 5a, 5b has coolant guide vanes 9a, 9b on the mutually facing end faces, which convey a coolant, for example air or a fluid, located inside the housing. The coolant is supplied to a respective cooling fin structure 11a, 11b formed integrally on one end wall 10a, 10b of the respective housing 3a, 3b, where the coolant is introduced via an inlet area 12a, 12b, flows radially outward through the coolant structure 11a, 11b and exits from an outlet 13a, 13b. In order to ensure a radially outward direction of flow, a cover 14a, 14b is placed on the respective cooling fin structure 11a, 11b, which will be discussed below, which is designed as an annular disk and which is arranged directly on the respective fins. This results in a plurality of radially outwardly directed coolant channels through which the inflowing cooling fluid is transported radially outward. Since the respective end wall 10a, 10b is cooled, which will be discussed below, the coolant is cooled during this flow. The forming coolant channels are axially open at the ends for a short distance to allow an axial inflow and outflow of the coolant.

Furthermore, in the area between the two housings 3a, 3b, or between the end walls 10a, 10b, provision is made for a distribution device 15, by way of which externally supplied coolant is distributed via respective housing-side inlets 16a, 16b, on the one hand, in order to cool the rotor 5a, 5b on the inside, but on the other hand also to cool the two end walls 10a, 10b. Two tubes 17a, 17b into which the supplied coolant flows and through which it is guided into the respective hollow rotor arm 8a, 8b are connected to the distribution device 15, which will be described in detail below. There it exits at the end and flows back and again into the distribution device 15, from where, as will be described below, it is then guided to corresponding housing-side outlets, not shown here. The distribution device also consists of two identical parts, namely the two distribution elements 18a, 18b, which is also described in detail below.

Figure 2:
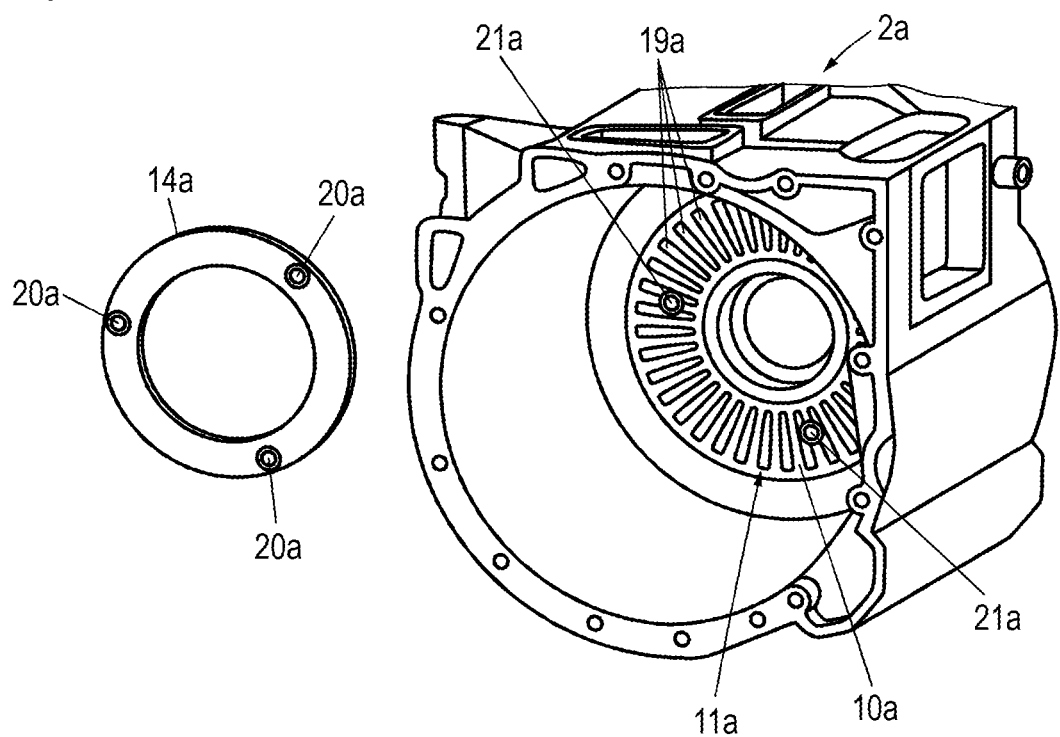
FIG. 2 shows a perspective view of a housing with a view into the housing and a separate cover for placing the cooling fin structure.

FIG. 2 shows a perspective view of the housing 2a, which, as described, is identical to the housing 2b, which is why all the following statements apply in the same way to the housing 2b and the cooling fin structure 11b formed there and the cover 14b shown there.

What is shown is a perspective view of the housing 2a looking into the interior of the housing. As can be seen, the cooling fin structure 11a is formed on the inside of the end wall 10a, comprising a plurality of radially outwardly extending cooling fins 19a which are formed integrally on the one-piece aluminum die-cast housing 2a.

Also shown is the cover 14a, which is designed as an annular disk and which is also a die-cast aluminum component. The cover 14a has corresponding bores 20a; the same number of bores 21a are provided and correspondingly distributed on the end wall 10a. During assembly, the cover 14a is placed on the cooling fin structure 11a so that it rests flat on the top of the cooling fins 19a and, viewed radially, covers them in sections, so that, on the one hand, the radially inner inlet area 12a and, on the other hand, the outlet area 13a located radially further out is formed. The bores 20a are congruent on the bores 21a, so that corresponding screws, which are not shown here in detail, can be passed through from the cover side and rest with their screw heads on the cover 14a, while they are bolted with corresponding nuts on the opposite side of the end wall 10a.

In this way, a corresponding integrated cooling device is implemented in a very simple way, which enables cooling of the coolant on the inside of the housing or by way of which said coolant can be actively conveyed via the coolant guide vanes 9a. Due to the integration of the cooling fin structure 11a directly in the housing 3a itself or on the end wall 10a, only the cover 14a has to be produced and assembled as a separate component for the final design of this cooling fin device, which, since the cover is a very simple geometric component, is possible in a simple manner and reproducible in one form through aluminum die-casting.

Figure 3:
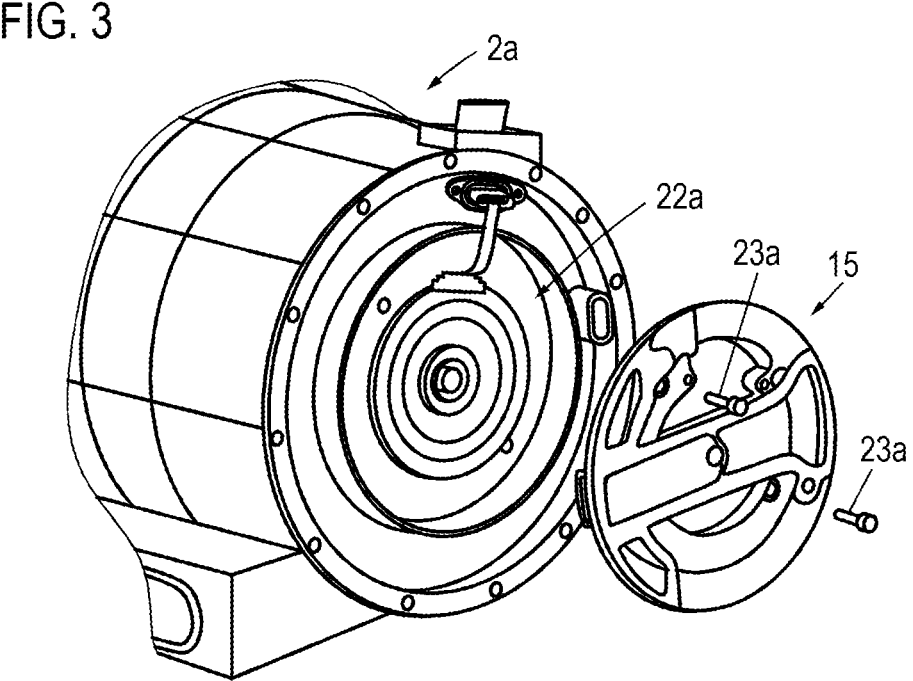
FIG. 3 shows an exploded view in a partial view of the housing from FIG. 2 from the other side with a separate distribution device.

FIG. 3 shows housing 2a as a partial perspective view from the other side, that is to say the side which faces the other housing 2b, and on which the distribution device 15 shown separately here is to be arranged. The distribution device 15 is inserted into a corresponding receiving area 22a of the housing 2a, with a corresponding receiving area of course also being provided on the identical housing 2b. As an example, the distribution device 15 is bolted here onto the housing 2a or onto the receiving area 22a via corresponding screw connections 23a, after which the second housing 2b is attached during assembly, which is then bolted onto the first housing 2a so that the distribution device 15 is accommodated in the two receiving areas which then complement each other.

As described, the distribution device 15 serves to distribute a coolant supplied via the housing-side inlets 16a, 16b, on the one hand, into the hollow rotor arm 8a, 8b, and, on the other hand, also in corresponding ring channels 24a, 24b, which are formed between the distribution device 15 or the two distribution elements 18a, 18b and the respective end wall 10a, 10b, which will also be discussed below.

Figure 4:
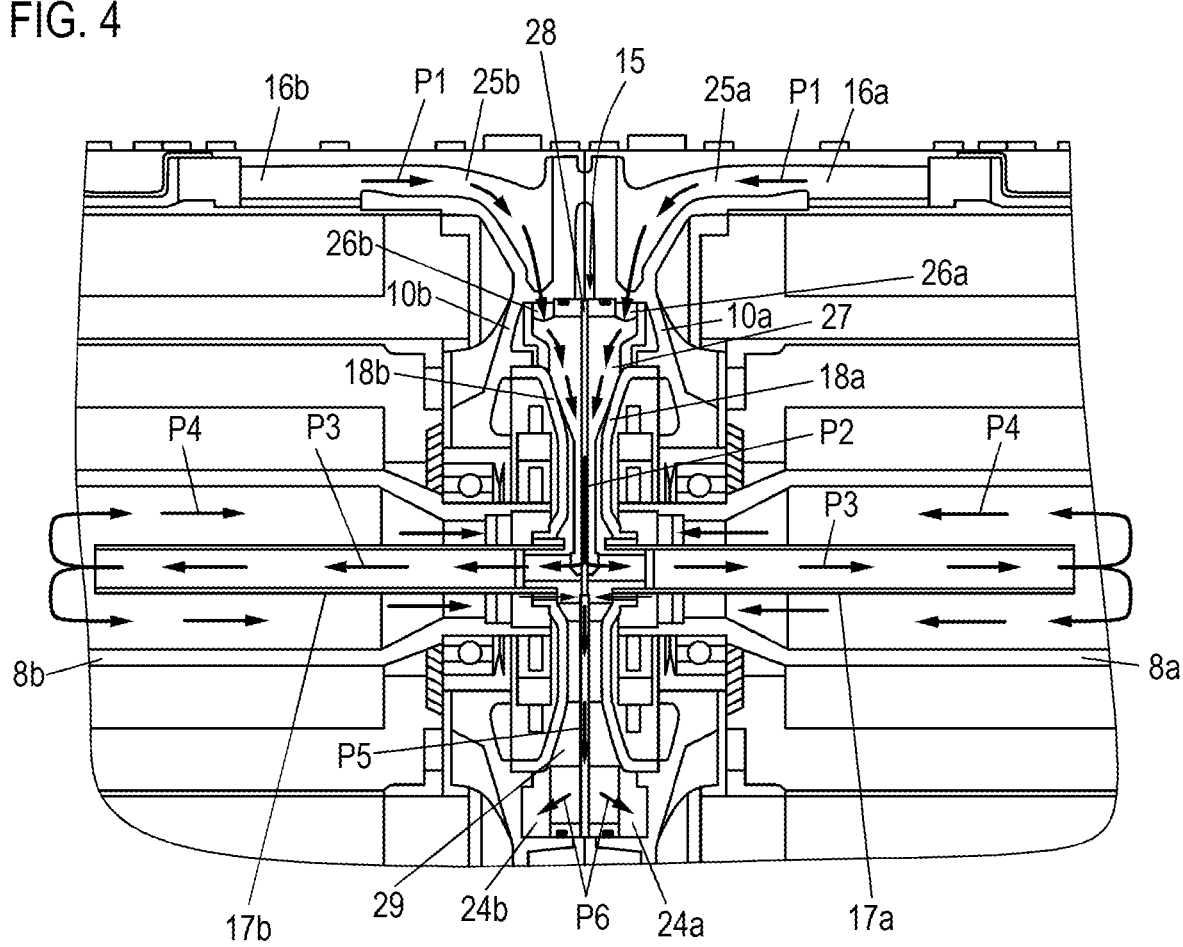
FIG. 4 shows an enlarged partial view of FIG. 1 showing the coolant flow.

The sectional partial view according to FIG. 4 shows the coolant flow. The coolant is supplied as described via the inlets 16a, 16b and flows via the housing-side channel sections 25a, 25b, as shown by the arrows P1, to the distribution device 15. The coolant reaches the distribution device via respective inlet openings 26a, 26b, which are formed in the respective distribution element 18a, 18b, and via them it reaches a common inlet channel 27, which is defined on both sides via the two distribution elements 18a, 18b, which have corresponding, complementary semi-geometries, and which, like the distribution device 15 as a whole, is sealed via an interposed sealing element 28 in the form of a molded seal. As shown by the arrows P2, starting from FIG. 4, the coolant then flows quasi radially downwards and, as shown, reaches the two tubes 17a, 17b, that is, the common coolant flow branches off to the right and left (arrows P3). The coolant flows through the tubes 17a, 17b, flows out of said tubes and into the hollow rotor arm 8a, 8b. From said hollow rotor arm 8a, 8b, as shown by the arrows P4, the coolant flows back and enters the distribution device 15 again. In said distribution device 15 it then flows into a common outlet channel 29, which is also defined or sealed on both sides via the two distribution elements 18a, 18b, which have corresponding semi-geometries, as is the sealing element 28. The coolant flows, as shown by the arrows PA, along this outlet channel 29 and, as shown by the arrows P6, then into the respective ring channel 24a, 24b, in which it then flows along the respective side wall 10a, 10b, cooling it down, to a transition (not shown in more detail) to the respective housing outlet, which will be discussed below.

Figure 5:
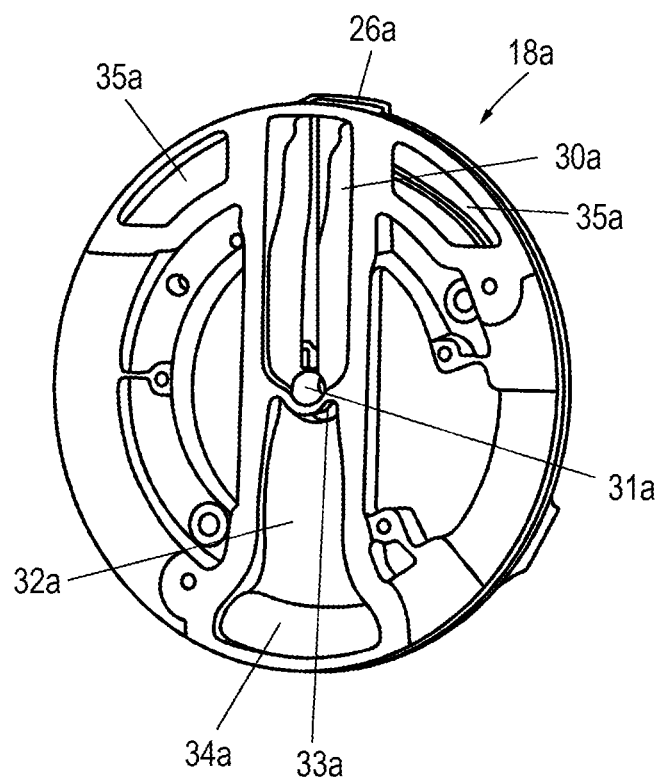
FIG. 5 shows a perspective view of a distribution element of the distribution device of FIG. 4.

FIG. 5 shows a schematic diagram of a perspective view of the distribution element 18a. This is designed identically to the distribution element 18b, so that all of the following statements apply in the same way to the distribution element 18b.

Figure 6:
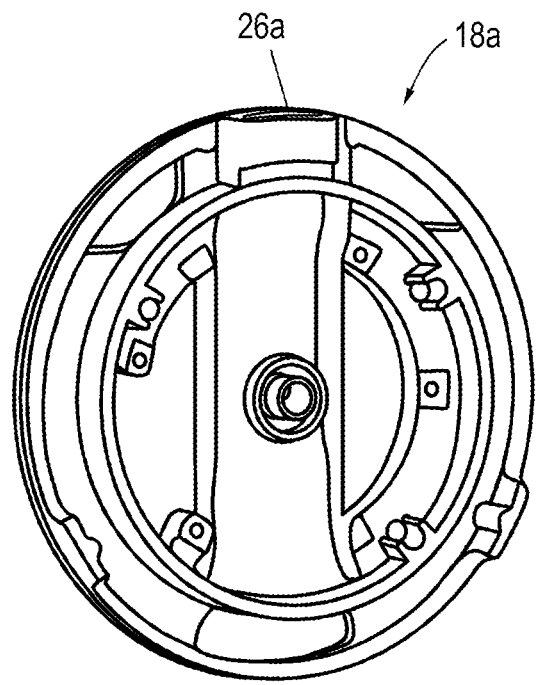
FIG. 6 shows a perspective view of the distribution element from the other side.

As described, the distribution element 18a may be produced as an aluminum die-cast component. In this regard, see also FIG. 6 which shows the distribution element 18a in perspective from the other side, it is quasi ring-shaped and, in a certain way, also disk-shaped. On the one hand, the inlet opening 26a is formed on it, which opens directly into an inlet channel section 30a which, together with the corresponding channel section of the distribution element 18a, forms the inlet channel 27. The inlet channel section 30a opens into an outlet opening 31a located in the middle of the distribution element 18a and thus also in the axis of rotation of the rotor, from which outlet opening 31a the coolant flows into the tube 17a. The outlet opening on the distribution element 18b is axially directly opposite, the coolant flows through it in the same way into the tube 17b.

In a quasi-axial extension of the inlet channel section 30a, an outlet channel section 32a is formed which, together with the corresponding outlet channel section of the distribution element 18b, defines the outlet channel 29. The coolant flowing back from the rotor arm 8a reaches the distribution device 15 or the common outlet channel 29 via a corresponding inlet opening 33a, wherein, of course, the coolant flowing in the opposite direction from the rotor arm 8b also enters the common outlet channel 29 via a corresponding inlet opening in the distribution element 18b.

The channel section 32a opens into an outlet opening 34a through which the coolant reaches the ring channel 24a. The distribution element 18b also has a corresponding outlet opening through which the coolant reaches the ring channel 24b, that is to say, the coolant flowing out of the common outlet channel 29 is again branched and reaches the corresponding ring channels 24a, 24b, in which it flows around the rotor axis and reaches the corresponding housing-side outlets.

Finally, two openings 35a are provided on the distribution element 18a, which are spaced apart from one another in the circumferential direction, after the inlet channel section 30a is formed between them. The coolant guided in the ring channels 24a, 24b flows out of the distribution device 15 via these openings 35a and to the housing-side outlets, where it is then discharged.

It can be seen that no complex hollow structures are to be formed on the respective distribution element 18a, 18b after which, when the distribution elements 18a, 18b are connected to the interposed sealing element 28 to form the distribution device 15, the corresponding channel structures, etc., are formed via the complementary shape geometries.

FIG. 7 again shows a view similar to that of FIG. 5, the tube 17a being attached to the distribution element 18a. The arrows P1 and P2 show the inflow of the coolant to the distribution device 15 and along the inlet channel 27, which is inevitably only half shown here. The lower arrow P2 shows the inflow of the coolant into the outlet opening 31a and thus into the tube 17a from which it exits at the end, as shown by the arrow P3.

Figure 8:
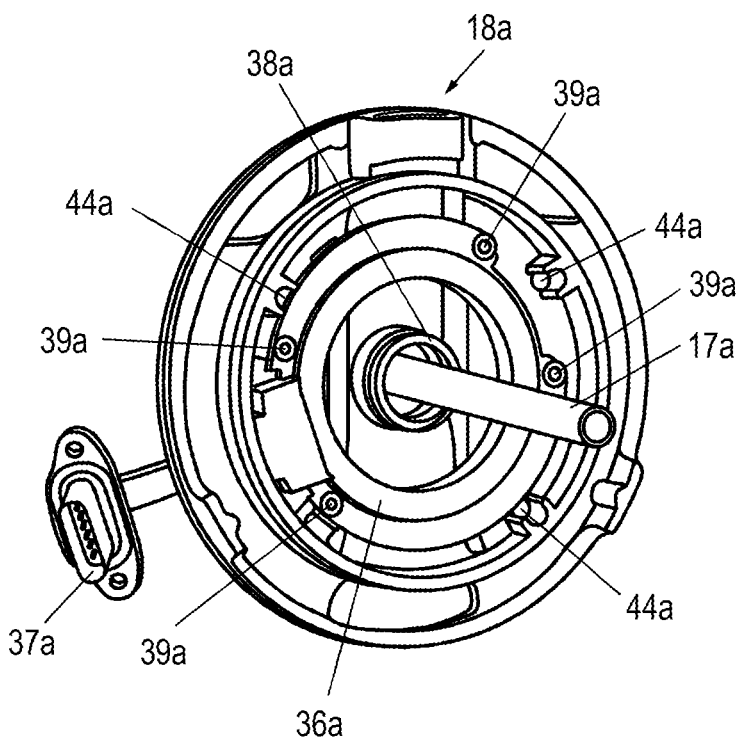
FIG. 8 shows the arrangement of FIG. 7 from the other side.

The perspective view according to FIG. 8 shows the distribution element 18a from the other side. A speed sensor 36a is arranged on it on the one hand and is connected to a plug element 37a via which the corresponding sensor signals can be routed to the outside, the corresponding mating connector not being shown in more detail. The speed sensor is fastened via corresponding screw connections 39a.

Figure 16:
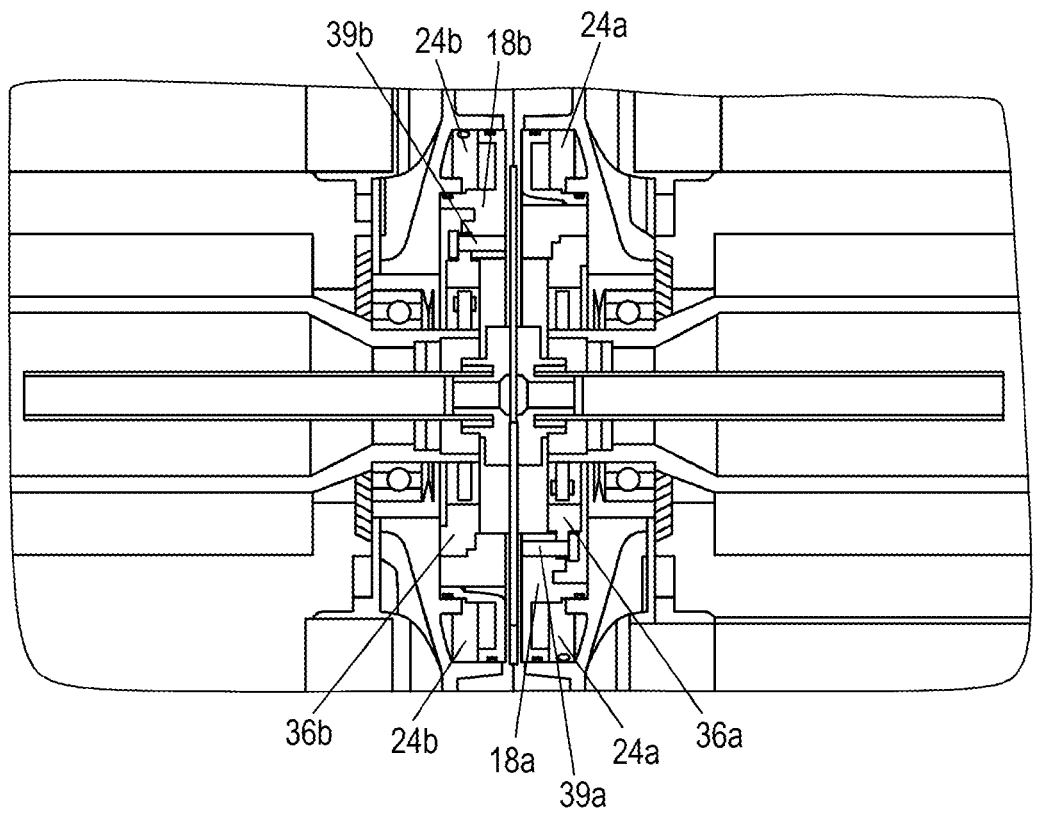
FIG. 16 shows a sectional partial view of the electric machine showing the ring channels that have been formed.

At this point, it should be noted that a corresponding speed sensor 36b is also provided on the distribution element 18b, since the speed of the rotor 5b, which is fixed via screw connections 39b, must of course be detected with high precision, see FIG. 16.

Also shown is a mechanical seal 38a on which the tube support 8a rests and is arranged above it in a rotative manner, but sealed with respect to the distribution device 15.

Figure 9:
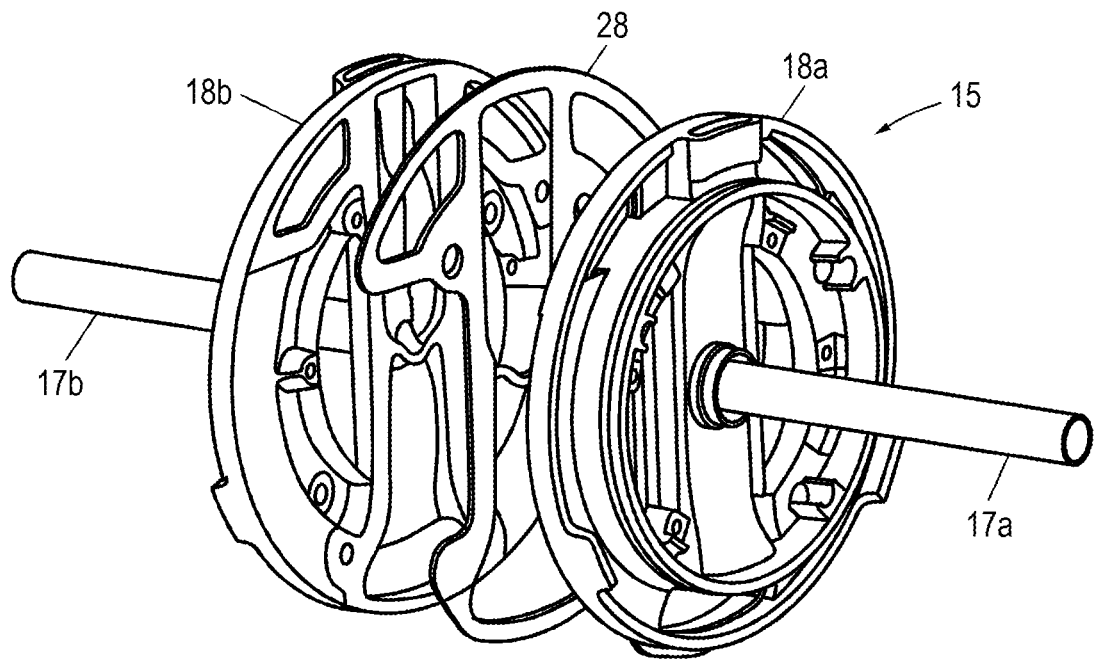
FIG. 9 shows an exploded view of the distribution device with the two distribution elements, the interposed sealing element and the two tubes.

FIG. 9 shows an exploded view of the distribution device 15 with the two distribution elements 18a, 18b and the interposed sealing element 28 in the form of a molded seal that abuts flat on the corresponding contact surfaces of the distribution elements 18a, 18b and in this way seals the corresponding structures against one another. Also shown are the two tubes 17a, 17b, which are already attached in the corresponding receptacles on the distribution elements 18a, 18b, such as plugged in and fixed by way of a corresponding clamp or press fit.

For assembly, the distribution elements 18a, 18b are now moved towards one another and include the sealing element 28 between them, after which the distribution elements 18a, 18b are bolted together.

Figure 10:
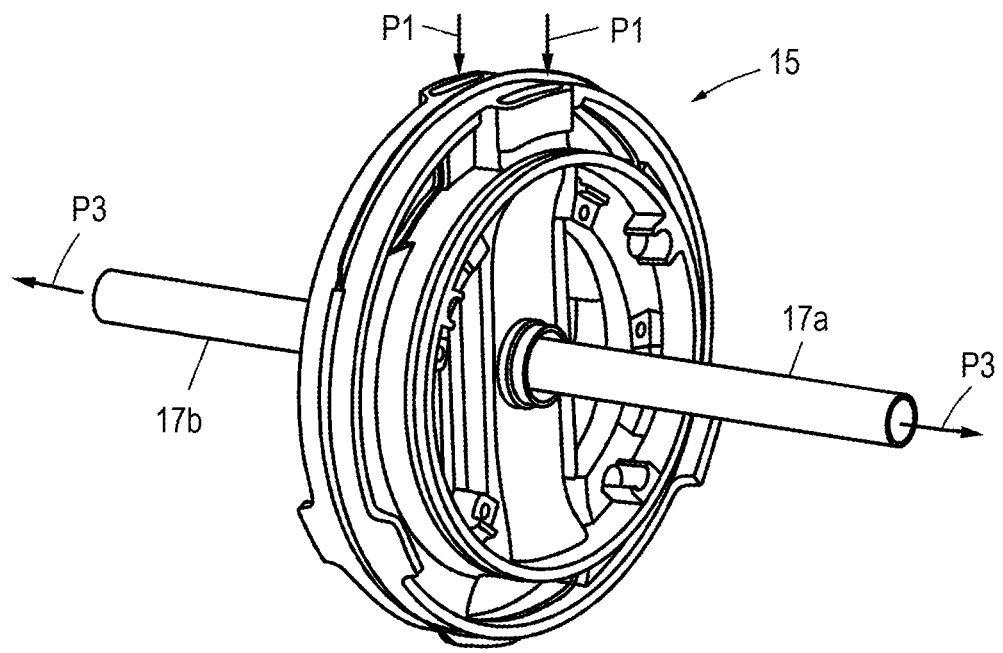
FIG. 10 shows the arrangement of FIG. 9 in the assembled state, showing the coolant flow.

FIG. 10 shows the assembly representation of the distribution device 15. The arrows P1 show the inflow of the coolant, for example water, into the distribution device 15, while the arrows P3 show the corresponding coolant exiting from the tubes 17a, 17b.

Figure 11:
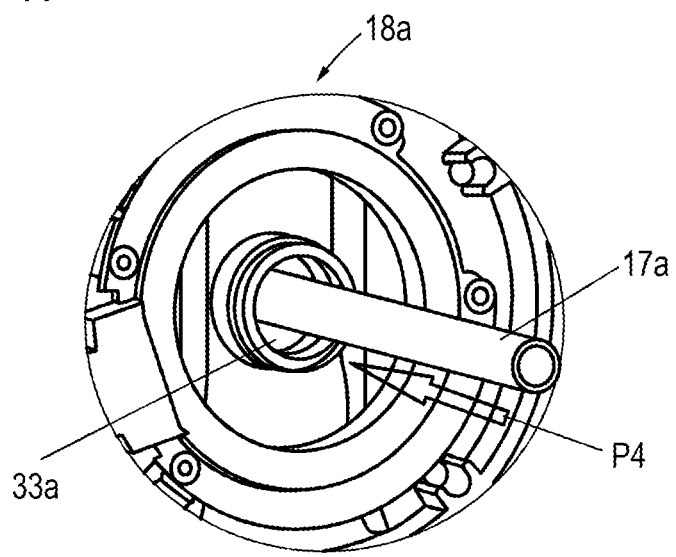
FIG. 11 shows a partial view of the distribution device showing the coolant return flow.
Figure 12:
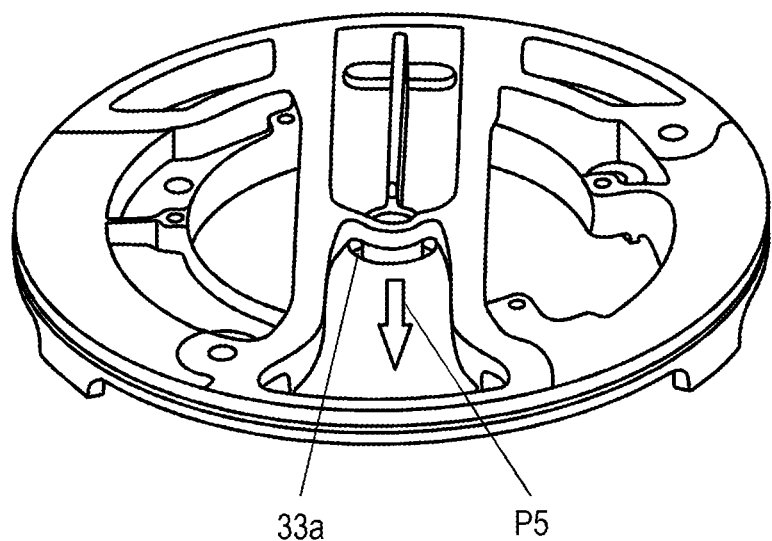
FIG. 12 shows a perspective view of a distribution element showing the coolant flow in and through the distribution device.

As described, the coolant flows back out of the respective tube support 8a, 8b and enters the distribution device 15. FIG. 11 shows in a partial view via the arrow P4 the backflowing water, which, in the area of the attachment of the tube 17a, re-enters the distribution device 15 or the distribution element 18a, namely into the inlet opening 33a, from where the coolant, see the perspective view according to FIG. 12 and the arrow PA, it enters the outlet channel 29 and flows along it radially outward. As described, the coolant enters from the other rotor arm 8*b* coming from the other side, that is to say via the distribution element 18*b*, which means that the two return flows are brought together again.

Figure 13:
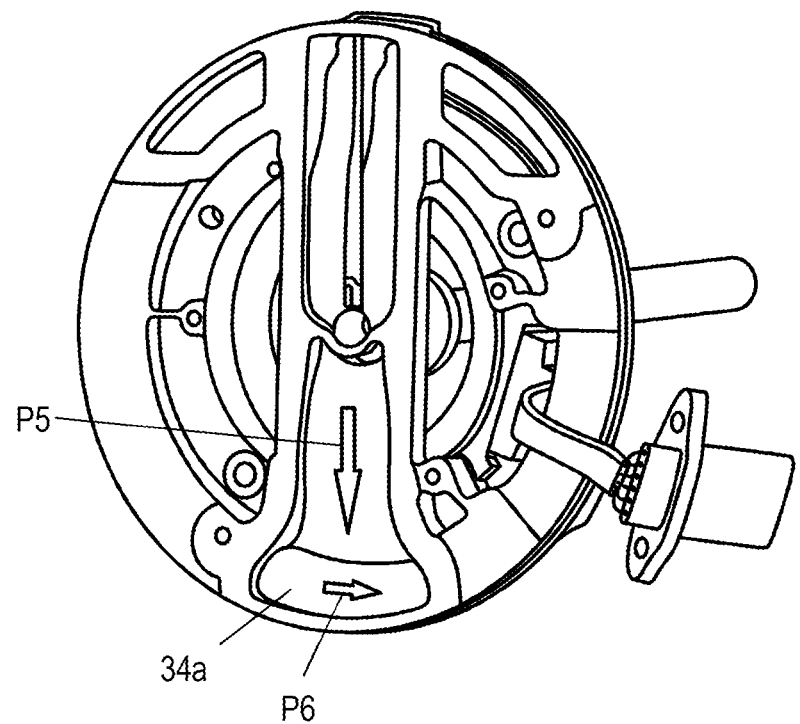
FIG. 13 shows a perspective view of the distribution element of FIG. 12, showing the coolant flow in and out of the outlet channel.

As shown in FIG. 13, the fluid then flows to the outlet opening 34*a*, where, see arrow P6, it enters the adjacent ring channel 24*a*. The same applies to the other side, where the coolant flows from the outlet channel 29 into the outlet opening formed on the distribution element 18*b* and from there into the ring channel 24*b*.

Figure 14:
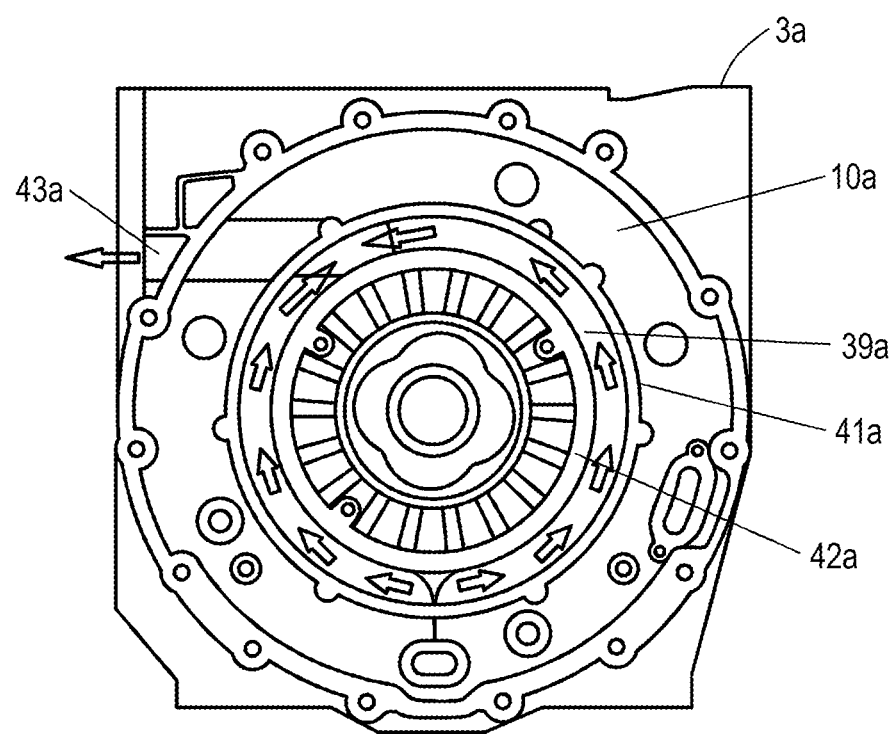
FIG. 14 shows an end view of the housing with a view of the end wall and representation of part of the ring channel in which the coolant flowing out of the distribution device circulates.
Figure 15:
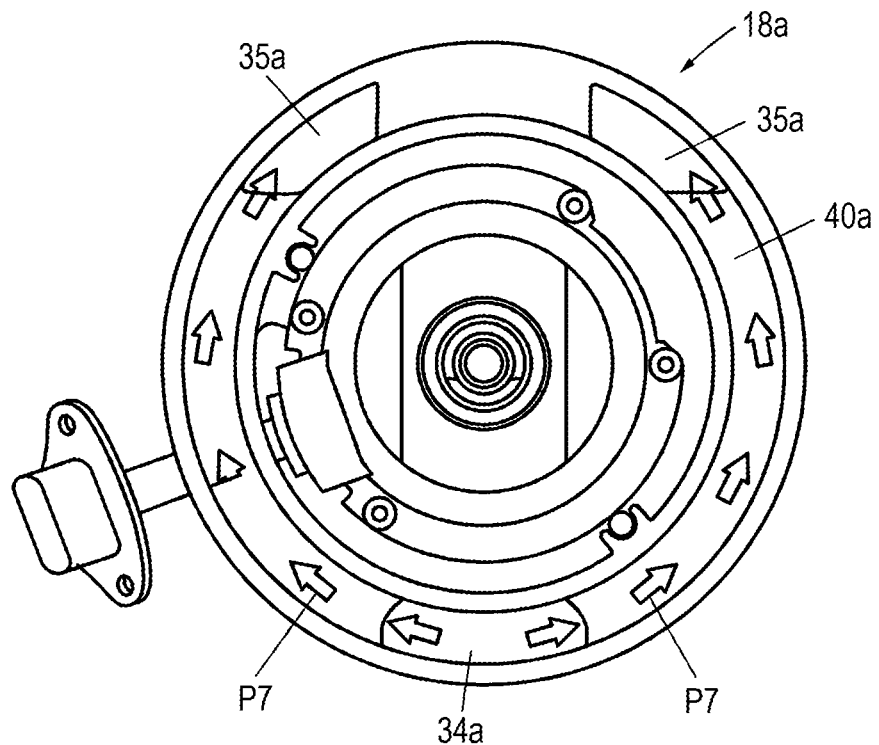
FIG. 15 shows a plan view of a distribution element which, together with the corresponding groove geometry on the end wall, delimits the ring channel, showing the coolant flow through the ring channel and its outlet to a housing-side outlet.

The ring channels 24*a*, 24*b* extend almost 360°, as is evident from FIGS. 14 and 15. FIG. 14 shows a plan view of the end wall 10*a* of the housing 3*a*. On the front wall 10*a*, a first ring channel section 39 is formed which combines with a corresponding ring channel 40, which, see FIG. 15, is formed on the distribution element 18*a*, both ring channel sections 39*a*, 40*a* are complementary and together form the annular channel 24*a*. Sealing takes place via corresponding sealing elements 41*a*, 42*a*, which in the example shown are arranged on the end wall 10*a*. The distribution element 18*a* rests with the side shown in FIG. 15 on the side of the end wall 10*a* shown in FIG. 14.

The coolant enters the ring channel 24*a* through the outlet opening 34*a* coming from the outlet channel 29 and flows from there on both sides around the ring channel 24*a*, as shown by the arrows P7. Since the ring channel 24*a*, the same applies of course to the ring channel 24*b*, is located on the outside of the end wall 10*a*, on the opposite inside of which the cooling fin structure 11*a* is formed, the end wall 10*a* is consequently cooled accordingly, this cooling also having an effect on the area of the cooling fin structure 11*a*. In particular, this is the case when, if possible, the respective ring channel 24*a*, 24*b* and the respective cooling fin structure 11*a*, 11*b* overlap, viewed radially.

The coolant flows through the ring channel 24*a* until it reaches the area of the openings 35*a*, from where it gets to the corresponding channel sections provided on the housing side, which then open into a respective housing-side outlet, only the outlet 43*a* of the housing 3*a* being shown in FIG. 14. The corresponding outlet is on the other side of the housing 3*b*, which, as described, is identical to the housing 3*a*. Both distribution elements 18*a*, 18*b* have corresponding openings, as shown with the openings 35*a* in FIG. 15, which are congruent. As a result, a corresponding entry is possible from both sides, which is why both housing-side channel structures that lead to the outlets are served, that is, the coolant can flow to both outlets.

Since it can be seen that the two openings 35*a*, 35*b* are not completely diametrically opposite the outlet opening 34*a*, but are nevertheless offset by a circumferential angle of approx. 150° or more to the outlet opening 34*a*, resulting in a ring channel 24*a*, 24*b* that runs very far so that there is a very large end wall cooling.

The two ring channels 24*a*, 24*b* can be seen again in FIG. 16, as can the two speed sensors 36*a*, 36*b*, which are bolted to the respective distribution element 18*a*, 18*b* via the corresponding fastening screws 39*a*, 39*b*.

Figure 7:
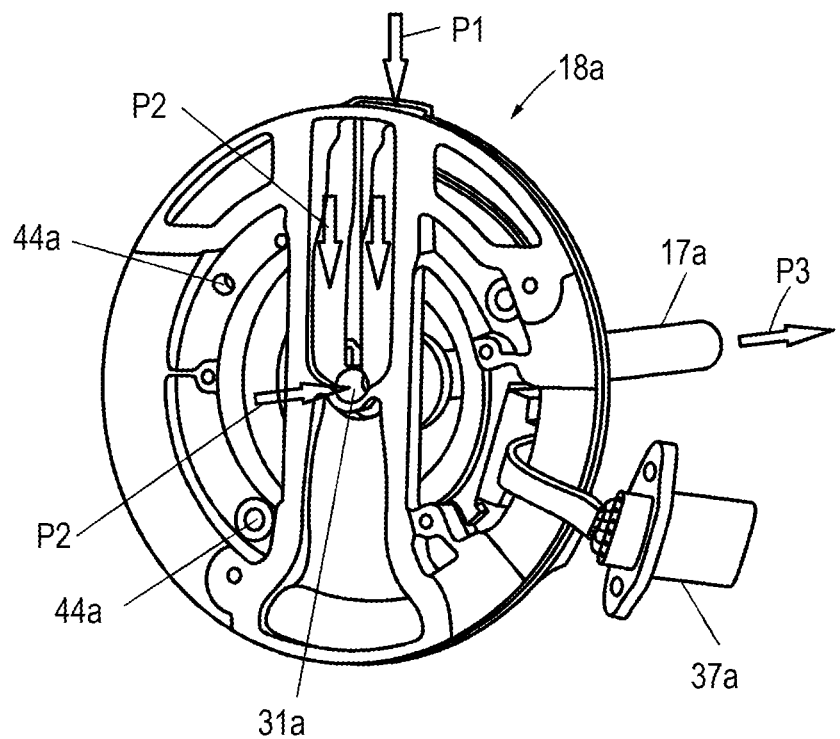
FIG. 7 shows a perspective view of the distribution element according to FIG. 5 with the tube arranged, showing the coolant flow.

As described, the two distribution elements 18*a*, 18*b* are firmly bolted to one another via screw connections not shown in detail. In particular, FIGS. 7 and 8 show the corresponding bores 44*a*, with corresponding bores of course being provided on the distribution element 18*b*. During assembly, these holes are congruent on top of each other so that the corresponding screw connections can be set.

German patent application no. 10 2019 131082.2, filed Nov. 18, 2019, to which this application claims priority, is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, comprising:
   at least one housing;
   a rotor accommodated within the housing, the rotor having an end face and coolant guide vanes provided at the end face; and
   an annular cooling fin structure through which coolant conveyed by the coolant guide vanes is passed, the annular cooling fin structure having cooling fins which are axially covered by an annular cover section in such a way that there is an inlet area for the coolant conveyed by coolant guide vanes and an outlet area,
   wherein the cooling fin structure is formed on a side of an axial end wall of the housing facing an interior of the housing, on which an annular disk-shaped cover forming the cover section is attached.

2. The electric machine according to claim 1, wherein the cover is bolted to the end wall.

3. The electric machine according to claim 2, wherein boreholes are provided on the cover and the end wall through which screws engage, which screws are supported on the cover with their screw head and are bolted by a nut on the end wall, or vice versa.

4. The electric machine according to claim 1, wherein the cover covers the fin structure over at least one third and up to two thirds of a fin length seen radially.

5. The electric machine according to claim 1, wherein two housings are provided, wherein the two housings are arranged like mirror-images, wherein a respective rotor, a respective cooling fin structure, and a respective cover are provided in each of the two housings, wherein a common distribution device for distributing coolant serving to cool the rotors and the end walls at least in the area of the fin structures is provided between the two housings.

6. The electric machine according to claim 5, wherein the distribution device has two ring-shaped and disk-shaped distribution elements between which a sealing element is arranged and which delimit one inlet channel and one outlet channel for the coolant.

7. The electric machine according to claim 6, wherein the inlet and outlet channels run radially and are offset from one another by 180°.

8. The electric machine according to claim 5, wherein the outlet channel opens into two ring channels, each ring channel formed between the respective end wall and the adjacent distribution element and opens into one or both of the housing-side outlets.

9. The electric machine according to claim 8, wherein each distribution element has an outlet opening, the two outlet openings being axially opposite one another and wherein the outlet channel is connected to one ring channel by each of the two outlet openings.

10. The electric machine according to claim 8, wherein each distribution element has an opening, wherein the openings are arranged adjacent to one another in a circumferential direction, and wherein the ring channels are connected to one or both housing-side outlets via the openings.

11. The electric machine according to claim 6, wherein an inlet opening is provided on each distribution element, both of which inlet openings open into the common inlet channel, or the two distribution elements delimit a common inlet opening which opens into the common inlet channel.

12. The electric machine according to claim 6, wherein a tube extending into a hollow rotor arm is connected to each distribution element, each distribution element having an outlet opening via which the inlet channel is connected to both tubes, and wherein each distribution element has an inlet opening via which coolant flowing back from the rotor arm flows into the outlet channel.

13. The electric machine according to claim 6, wherein both distribution elements are identical, but are arranged mirror-inverted to one another.

14. A motor vehicle, comprising at least one electric machine, the at least one electric machine comprising:
   at least one housing;
   a rotor accommodated within the housing, the rotor having an end face and coolant guide vanes provided at the end face; and
   an annular cooling fin structure through which coolant conveyed by the coolant guide vanes is passed, the annular cooling fin structure having cooling fins which are axially covered by an annular cover section in such a way that there is an inlet area for the coolant conveyed by coolant guide vanes and an outlet area,
   wherein the cooling fin structure is formed on a side of an axial end wall of the housing facing an interior of the housing, on which an annular disk-shaped cover forming the cover section is attached.

15. The motor vehicle according to claim 14, wherein the electric machine is part of a rear axle of the motor vehicle.

* * * * *